Patented Mar. 7, 1933

1,900,728

UNITED STATES PATENT OFFICE

HERMANN OEHME, OF COLOGNE-KALK, GERMANY, ASSIGNOR TO CHEMISCHE FABRIK KALK G. M. B. H., OF COLOGNE-KALK, GERMANY

VULCANIZED RUBBER COMPOSITION AND PROCESS OF VULCANIZING RUBBER

No Drawing. Application filed February 6, 1931, Serial No. 514,053, and in Germany June 26, 1926.

The invention relates to vulcanized rubber compositions and in particular comprises a new and improved vulcanized rubber composition as well as a process of vulcanizing rubber.

The new composition is obtained by employing in the otherwise old process of vulcanizing rubber by heat or cold cure an improved form of zinc oxide possessing new and characteristic properties which oxide is obtained in accordance with a special method. The properties of this new and improved zinc oxide differentiate it from all the zinc oxides heretofore employed in the art of compounded rubber and make its use particularly advantageous for curing rubber compositions.

The oldest feature in the art of producing vulcanized rubber compounds comprises admixing a certain amount of sulfur with rubber and applying heat to the mixture for varying periods. In order to shorten the heating periods and to lower the temperature of curing and to generally improve the properties of the vulcanized products, an addition of organic substances known under the name of accelerators has been suggested; but the accelerating agents in general use require a supplemental addition of a metallic oxide, preferably zinc oxide as an activator. The zinc oxide used for this purpose and for reinforcing the composition has been produced by a pyrogenetic process i. e. by igniting the vapors of metallic zinc and collecting the zinc oxide thus obtained in accordance with the well-known French or American processes, and with special methods of obtaining a zinc oxide having a particularly small particle size which is marked under the commercial name of Cadox, which zinc oxides are characterized by pronounced pigmenting properties. Furthermore a more recent suggestion provides for the substituting of the zinc oxide in the rubber composition by zinc hydroxide or zinc oxyhydrates.

In accordance with my present invention, which is in part a continuation of my co-pending applications Serial No. 181,267, filed April 5, 1927; Serial No. 386,737, filed August 17, 1929; and Serial No. 387,553, filed August 21, 1929, a non-pigmentous zinc oxide prepared by a wet method is incorporated with the rubber composition to be vulcanized. Excluding any pyrogenetic steps in its production, such a zonc oxide is chiefly obtained by precipitating a zinc compound containing volatile residues (which will be defined hereafter), say, a zinc hydroxide or carbonate, from a zinc salt solution or suspension and heating the precipitate under such conditions as to produce a zinc oxide having non-pigmenting properties. A non-pigmentous zinc oxide of similar properties may be also obtained by heating a zinc salt containing volatile organic residues such as zinc formate or acetate under the conditions just referred to. Another way to produce a zinc oxide suitable for this invention is to convert any zinc oxide into a zinc compound containing volatile residues for example by treating it with sodium bicarbonate and treating the resulting compound under the conditions more fully set forth before. The term "volatile residues" is intended to denote such residues combined with zinc, for example hydroxy or carbonic acid groups, as will be readily split off at a temperature below dark red heat viz. a temperature not exceeding 600° C.

The most important feature in the production of the new zinc oxide suitable for vulcanizing rubber is the proper heating of the initial or intermediate zinc compound. It is known that pigmentous zinc oxide may be obtained by calcining zinc carbonate, hydroxide or nitrate at a very high temperature which zinc oxide has also been suggested for use in compounding rubber. The zinc oxide of this invention, however, is prepared at a much lower temperature and does not possess any pigmenting properties. The high temperatures required for producing pigmentous zinc oxides have been found to be detrimental to its activating properties in compounding rubber. On the other hand, the new zinc oxide of this invention is different from the zinc oxyhydrates of my prior U. S. Patent 1,565,812 in that it is practically free of any combined water or other volatile residues. Moreover, the temperatures employed for preparing zinc oxyhydrates must not exceed 200° C. whereas the zinc oxide of the present invention is produced at a temperature higher than 200° C. and generally not exceeding the temperature of dark red heat i. e. 600° C. If the temperature of heating does not exceed 600° C., the time of heating does not require particular attention; if, however, the heating is carried out at a temperature exceeding 600° C., special care must be taken not to extend the heating any longtr than is required for splitting off the volatile residues. For on prolonged heating at a high temperature the zinc oxide will change its structure and change to a zinc oxide having pigmenting properties. The very favorable properties of the new zinc oxide, however, exclusively depend on the proper structure which is substantially indicated by the non-pigmenting properties of the heated product. Incidentally, I wish it to be understood that temperatures used in the pyrogenetic process, i. e. temperatures of 1000° C. and above, are excluded in preparing a zinc oxide suitable for carrying out the present invention from a zinc compound containing volatile residues.

The method of obtaining zinc oxide products for the purpose of this invention is illustrated by the following examples. It is more fully described and claimed in my copending application Serial No. 384,519, filed August 8, 1929, and I do not make any claim on it in the present application. The parts in the following examples are by weight, if not otherwise indicated.

*Example 1*

An aqueous solution containing 16 percent of zinc sulfate and having a temperature of 60 to 70° C. is allowed to run into a solution of 10 kilograms of sodium carbonate in 100 liters of water having the same temperature, until a test shows that the first traces of zinc are going to appear in the solution. About 80 liters of zinc sulfate solution are required. The precipitate is filtered, washed until no more sulfate ions are in the filtrate, dried and heated to 350 to 400° C. until carbon dioxide ceases to escape.

*Example 2*

A solution of 10 kilograms of zinc chloride in 100 liters of water is precipitated at 30° C. by means of a fine levigated 6% suspension of calcium hydroxide, until a very slight trace of zinc remains in the solution. About 57 liters of the suspension of lime are required. The precipitate is filtered, washed until a test shows that no more calcium ions are in the filtrate, and suspended in about 150 liters of water. The suspension is heated to 40 to 50° C. and sodium bicarbonate is added as long as the chloride content of the solution rises. About 21 kilograms of sodium bicarbonate are necessary. Then the suspension is filtered, the cake is washed until the filtrate is free of salt and calcined at 520° C.

*Example 3*

100 kilograms of zinc oxide having a particle size of more than 1 micron and a "shaking weight" (defined hereafter) of 0.7 are suspended in 250 liters of water, mixed with 200 kilograms of sodium bicarbonate and stirred at room temperature for one hour. The precipitate is filtered, washed until free of alkali metal salt and calcined at 450° C.

*Example 4*

100 kilograms of moist zinc oxychloride containing 26.3% of zinc, 2.95% of combined chlorine (which corresponds to 11.2 parts of chlorine in every hundred parts of zinc) and having a filling weight of 0.71 are suspended in a solution of 7.5 kilograms of sodium bicarbonate in 500 liters of water and stirred for two hours while stirring and gradually raising the temperature to 90° C. The resulting zinc hydrocarbonate is filtered, washed and dried; it contains 8.98% of carbon dioxide, 0.18% of chlorine and possesses a filling weight of 0.3 which means that 300 g. of the zinc hydrocarbonate fill a volume of 1000 cc. Heating this zinc hydrocarbonate to 450 to 480° C. produces a zinc oxide containing but traces of carbon dioxide and water and having a filling weight of 0.29.

*Example 5*

100 kilograms of the same zinc oxychloride as used in Example 4 are suspended in a solution of 4.7 kilograms of sodium carbonate in 500 liters of water and heated for two hours while stirring and raising the temperature to 90° C. The resulting zinc hydrocarbonate contains 4.4% of carbon dioxide and 0.35% of chlorine after filtering, washing and dryng. Heating it to 480° C. produces a zinc oxide having a filling weight of 0.51.

The foregoing examples result in a zinc oxide of a definite structure different from the zinc oxides of the prior art. The particular structure of my improved zinc oxide will be more fully evidenced by the following:

All the zinc oxides of my invention—irrespective of any exemplified method according to which they have been prepared—have the common feature of possessing a very slight or practically no coloring strength or hiding power. A comparative measure of this characteristic may be obtained by mixing an equal amount of different zinc oxides with a black pigment and determining the quantities of black pigment which are necessary to produce the same grey shade. For example the mixtures of 100 grams of zinc oxide Red Seal (obtained according to a pyrogenetic process) and 11 grams of black iron oxide (ferroso ferric oxide), 100 grams of zinc oxide Cadox Red Label and 7 grams of black iron oxide, 100 grams of a zinc oxide obtained according to foregoing Example 1 and 1 gram of black iron oxide resulted in coatings of same shade and color strength when mixed with linseed oil and applied to a pane of glass. In other words, the hiding power of zinc oxides Red Seal and Cadox is much higher than that of my improved zinc oxide; they require more of the black pigment to reduce their white to grey. It may be well assumed that the respective coloring strengths are in the same ratio as the quantities of black pigment added, i. e. that the proportions are 11:7:1. Generally speaking, the coloring strength of the new zinc oxide when tested for its pigmenting properties in accordance with the aforedescribed method is no more than 15% of zinc oxide Red Label or 9% of zinc oxide Red Seal.

The particle size of the new zinc oxide is very small. In accordance with a roentgenographic mensuration it probably is about 0.013±0.005 microns (for the details of the measuring method v. Brill and Pelzer, Zeitschrift für Kristallographie, vol. 72, page 398, 1929). The finest zinc oxide in the market (Cadox) is said to have a particle size of about 0.15 microns.

The new zinc oxide is an extremely loose powder of a large surface area. This looseness of structure is indicated by what I may call the "shaking weight". For determining this characteristic 100 grams of zinc oxide are placed in a 500 ccm measuring cylinder and pushed on a wooden support as long as the volume decreases. When a constant volume is attained, say, a cc the "shaking weight" is to be $$\frac{100}{a}$$

The different brands of zinc oxide exhibit the following "shaking weights":

Zinc oxide Red Seal_____ 0.71
Zinc oxide Cadox Red Label_____ 0.74
Zinc oxide obtained in accordance
  with Examples 1–5_____ 0.25–0.45

The looseness of structure also implies an outstandingly high oil absorption. To test the oil absorption, 2 grams of each zinc oxide to be tested is mixed with linseed oil drop by drop and well ground. "The test is complete when exactly enough oil has been incorporated with the pigment to produce a very stiff putty-like paste, which does not break or separate." (Gardener, Physical and Chemical Examination of Paints, Varnishes, Lacquers and Colors, 1927, page 260.) 100 grams of each zinc oxide are found to require the following number of grams of linseed oil:

Zinc oxide Red Seal_____ 27.9
Zinc oxide Cadox Red Label_____ 41.8
Zinc oxide obtained in accordance
  with Example 1 more than_____ 75.

Another difference from the old zinc oxides is the adsorption power of the new zinc oxide which is liable to adsorb, for example, colloidal metals from colloidal metal solutions. For practical tests I take an aqueous solution containing 0.1% of Kollargol, a commercial silver preparation containing about 70% of metallic silver. 1 gram of each zinc oxide is suspended in 150 cc. of water and shaken with 100 cc. of the aforesaid 0.1% solution for two minutes. The relative adsorption is with Zinc oxide Red Seal—13.3% of the Kollargol used=1.0 part,
Zinc oxide Cadox Red Label—16.0% of the Kollargol used=1.2 parts,
Zinc oxides obtained in accordance with Examples 1–5—35–50% of the Kollargol used=2.7–3.8 parts.

In addition to the above mentioned characteristics there are other properties which are apt to demonstrate the different structure of various zinc oxides. It has been found that zinc oxide generally reacts with an aqueous solution of sodium thiosulfate. For instance, zinc oxide for analytical purposes or zinc oxide Red Seal is suspended in distilled water and the possibly acid or alkaline reaction of the suspension which may be due to impurities, is removed by adding N/10 sodium hydroxide solution or N/10 hydrochloric acid until the suspension reacts neutral against phenolphthaleine i. e. until red coloration is obtained on the addition of one drop of N/10 sodium hydroxide solution. The thus prepared solution when mixed with a neutral 10% sodium thiosulfate solution will adopt a black color on being exposed to day-light or short-wave light such as ultra-violet rays. This black color is probably due to an interaction of sodium thiosulfate with zinc oxide to form zinc sulfide which is photochemically reduced to metallic zinc. If, however, a zinc oxide as obtained in any of examples given above, or of like structure is subjected to the same procedure, it remains unchanged on exposure to sunlight or short-wave rays in the presence of sodium thiosulfate solution even when the exposure is continued for a very long time.

The publications of various authors (for example, Danckwordt, Luminiszenzanalyse, Leipzig, 1928, page 40) disclose that pulverous zinc oxide of different origins shows a greenish-yellow to yellow and, in the case of very impure products, even an orange fluorescence when exposed to ultra-violet light i. e. light having a wave length of less than 4000 Angstroem units. The character of this fluorescence color is not materially influenced by impurities (v. Robb, Zeitschrift für angewandte Chemie, vol. 39, page 608, 1926). If a zinc oxide as claimed in the present application for use in compounded rubber is exposed to the rays of a luminous arc of mercury vapor which rays have been filtered through a pane of glass appearing nearly black to the eye to allow only light of less than 4000 Angstroem units wave length to pass through, the zinc oxide powder will fluoresce violet brown to sepia brown.

The foregoing characteristics show the considerable differences existing between the new zinc oxide and the zinc oxides heretofore available in the art. These valuable properties disclosed make it useful for various purposes, but it is of particular value for use in compounding rubber. Its use in rubber compositions involves a material improvement in the reinforcing properties and in the resistance to abrasion, as well as in the tensile strength of rubber, the acceleration of the cure and improved ageing qualities as compared with all the zinc oxides hitherto in commercial use.

A. When treated on milling rolls or in a mixer the new zinc oxide requires considerably more time for mixing than zinc oxide Red Seal or Cadox. The ratio of periods required for thoroughly mixing 100 parts of zinc oxide and 100 parts of rubber is about $$1 : 1.25 : 1.8$$

for zinc oxide Red Seal, zinc oxide Cadox and zinc oxide as obtained in Example 1. The new zinc obviously acts very similarly to carbon black when treated on milling rolls. This suggests the necessity of using the same procedure (master batches) and admixtures of softening agents, (stearic acid, Kautschol, which is an alcoholic extract of coal tar), as are known for carbon black, provided compositions having a high percentage of zinc oxide are compounded.

B. There is a pronounced difference in the strength of color which the new zinc oxide exhibits in rubber compositions as compared with other zinc oxides. The strength of the white color has been found to be only about half as much as in the cases of zinc oxides Red Seal and Cadox. The new zinc oxide is therefore rather close to commercial zinc carbonate as regards strength of white color. For example a transparent rubber compound made up of the following ingredients

| | Parts |
|---|---|
| First latex crêpe | 100.0 |
| Sulfur | 1.0 |
| Paraffin oil | 2.0 |
| Mercaptobenzothiazol | 0.4 |
| Hexamethylene tetramine | 0.4 |
| Thermax carbon black | 1.0 | and increasing quantities of zinc oxide exhibits the following strength of white color measured by comparing with the "Grauskala" (grey scale) of Ostwald.

*Table 1*

| Quantity of zinc oxide | Zinc oxide Red Seal | Cadox Black Label | New | Zinc carbonate |
|---|---|---|---|---|
| Per cent | | | | |
| 5 | 5.6 | 5.6 | 4.5 | 4.5 |
| 10 | 8.9 | 8.5 | 5.0–5.5 | 5.0 |
| 20 | 12.0 | 11.0 | 5.3–6.0 | 5.3 |
| 40 | 16.0 | 14.0 | 7.0 | 5.6 |

C. The following table will show more fully the comparative properties of cured rubber when compounded with zinc oxides Red Seal and Cadox or the new zinc oxide. The new zinc oxide considerably improves the tensile strength, elongation and resistance to abrasion of the rubber composition and imparts very good reinforcing properties to the compound. This will be evident from the accompanying tables representing the properties of composition containing 66 or 100 percent of zinc oxide calculated on rubber, the curing of which is accelerated by a condensation product obtained in accordance with Example 1 of U. S. application Serial No. 484,234, filed September 24, 1930 (Tables 2 to 5) and diphenyl guanidine (Tables 6 to 8). Eventually Tables 9 to 11 show the properties of a composition containing 150 parts of zinc oxide on 100 parts of a rubber-like polymerisate obtained by the action of metallic sodium upon 1.3 butadien, the curing of which is accelerated by means of dithiocarbamate of dekahydroquinaldine.

As to the activating effect on the organic accelerators the new zinc oxide is distinctly superior to pyrogenetic zinc oxide. Smaller amounts of the new zinc oxide will suffice to produce the same curing degree and using the same quantities the curing of the composition will be finished sooner. The composition cured with the new zinc oxide has much better properties as to tensile strength, hardness, elasticity and ageing than the same composition cured with a pyrogenetic zinc oxide as will be seen from Tables 12 to 15 representing the respective properties of a technical composition for rubber hose containing 66 parts of caolin, 10% of mineral rubber and 16 or 12.5% of the new zinc oxide when cured with diphenyl guanidine.

*Compound*

| | Parts |
|---|---|
| Smoked sheets | 100.0 |
| Stearic acid | 1.0 |
| Kautschol | 2.0 |
| Sulfur | 3.8 |
| Condensation product according to Serial No. 484,234 | 1.5 |
| Red iron oxide | 5.0 |
| Zinc oxide | 66.0 |

Table 2

| Curing | | Zinc oxide new | | | |
|---|---|---|---|---|---|
| Press. atm. | Time min. | Tensile strength kgs/qcm | Elongation percent | Loads (kgs/qcm) for elongation of | |
| | | | | 300% | 500% |
| 0.5 | 30 | 22 | 792 | | |
| | 60 | 75 | 845 | | |
| 3 | 22 | 270 | 680 | 46 | 137 |
| | 33 | 278 | 678 | 52 | 144 |
| | 45 | 280 | 683 | 54 | 149 |
| | 60 | 276 | 665 | 56 | 150 |
| | 80 | 255 | 634 | 55 | 148 |
| | 120 | 240 | 642 | 51 | 145 |

ZINC OXIDE CADOX RED LABEL

| 0.5 | 30 | 12 | 890 | | |
|---|---|---|---|---|---|
| | 60 | 45 | 895 | | |
| 3 | 22 | 234 | 734 | 28 | 79 |
| | 33 | 248 | 703 | 32 | 91 |
| | 45 | 249 | 690 | 34 | 97 |
| | 60 | 234 | 685 | 37 | 102 |
| | 80 | 229 | 675 | 36 | 100 |
| | 120 | 207 | 683 | 35 | 93 |

ZINC OXIDE RED SEAL

| 0.5 | 30 | 9 | 845 | | |
|---|---|---|---|---|---|
| | 60 | 34 | 862 | | |
| 3 | 22 | 210 | 735 | 26 | 74 |
| | 33 | 226 | 715 | 31 | 88 |
| | 45 | 233 | 700 | 34 | 94 |
| | 60 | 210 | 680 | 35 | 97 |
| | 80 | 208 | 675 | 36 | 96 |
| | 120 | 204 | 690 | 35 | 89 |

Table 3.—Elasticity %—Hardness in Shore's durometer degrees

| Curing | | Zinc oxide new | | Zinc oxide Cadox | | Zinc oxide Red Seal | |
|---|---|---|---|---|---|---|---|
| Press. atm. | Time min. | | | | | | |
| 3 | 22 | 71% | 54° | 71% | 47° | 70% | 46° |
| | 33 | 71% | 55° | 73% | 50° | 72% | 49° |
| | 45 | 73% | 56° | 74% | 50° | 74% | 51° |
| | 60 | 72% | 57° | 74% | 51° | 74% | 51° |
| | 80 | 72% | 58° | 71% | 52° | 74% | 52° |
| | 120 | 69% | 57° | 70% | 51° | 70% | 51° |

Table 4.—Resistance to abrasion (American machine). Loss in cc of volume

| Curing | | Zinc oxide new | Zinc oxide Cadox R. L. | Zinc oxide Red Seal |
|---|---|---|---|---|
| Press. Atm. | Time min. | | | |
| 3 | 33 | 305 | 340 | 400 |
| | 45 | 295 | 320 | 370 |

Table 5.—Resistance to abrasion (American machine). Loss in cc of volume. Tearing resistance in kgs (slab of 2 mm thickness)

| 3 | 33 | 22–20 | 16–15 | 12–11 |
|---|---|---|---|---|

Compound

| | Parts |
|---|---|
| Smoked sheets | 100.0 |
| Kautschol | 2.9 |
| Diphenylguanidine | 0.95 |
| Sulfur | 3.75 |
| Zinc oxide Red Seal or zinc oxide Cadox | 100 |

| | Parts |
|---|---|
| Smoked sheets | 100.0 |
| Kautschol | 4.2 |
| Diphenylguanidine | 0.95 |
| Sulfur | 3.75 |
| Cumar resin | 0.3 |
| Zinc oxide new | 100 |

Table 6

| Curing | | Zinc oxide new | | | |
|---|---|---|---|---|---|
| Press. atm. | Time min. | Tensile strength kgs/qcm | Elongation percent | Loads (kgs/qcm) for 4 elongation of | |
| | | | | 300% | 500% |
| 3.5 | 20 | 270 | 648 | 67 | 167 |
| | 30 | 267 | 665 | 74 | 176 |
| | 45 | 255 | 645 | 73 | 169 |
| | 60 | 249 | 640 | 70 | 161 |
| | 80 | 226 | 633 | 67 | 153 |

ZINC OXIDE CADOX RED LABEL

| 3.5 | 20 | 245 | 693 | 46 | 124 |
|---|---|---|---|---|---|
| | 30 | 252 | 672 | 51 | 135 |
| | 45 | 249 | 663 | 54 | 137 |
| | 60 | 225 | 646 | 52 | 129 |
| | 80 | 211 | 648 | 48 | 119 |

ZINC OXIDE RED SEAL

| 3.5 | 20 | 225 | 710 | 41 | 108 |
|---|---|---|---|---|---|
| | 30 | 235 | 685 | 46 | 119 |
| | 45 | 238 | 655 | 49 | 128 |
| | 60 | 220 | 650 | 52 | 126 |
| | 80 | 206 | 635 | 51 | 122 |

Table 7.—Elasticity %—Hardness in Shore's durometer degrees

| Curing | | Zinc oxide new | | Zinc oxide Cadox R. L. | | Zinc oxide Red Seal | |
|---|---|---|---|---|---|---|---|
| Press. atm. | Time min. | | | | | | |
| 3.5 | 30 | 63% | 59° | 70% | 52° | 70% | 50° |
| | 45 | 63% | 59° | 70% | 54° | 70% | 53° |
| | 60 | 60% | 59° | 67% | 53° | 70% | 54° |
| | 80 | 58% | 58° | 64% | 52° | 67% | 52° |

Table 8.—Tearing resistance in kgs (slab of 2 mm thickness)

| | | | (Curing Press. 3.5 atm.) | (Curing Press. 3.5 atm.) |
|---|---|---|---|---|
| 3 | 20 | 20.5 | 16 | 8 |
| | 30 | 18 | 12 | 8 |

Compound

| | Parts |
|---|---|
| Butadien-polymerisate | 100.0 |
| Stearic acid | 4.0 |
| Sulfur | 2.0 |
| Dithiocarbamate of dekahydroquinaldine | 1.8 |
| Zinc oxide new or Cadox Red Label | 150 |

Table 9

| Curing | | Zinc oxide new | | | | Zinc oxide Cadox R. L. | | | |
|---|---|---|---|---|---|---|---|---|---|
| Press. atm. | Time min. | Tens. str. kgs/qcm | Elongation p. c. | Loads f. elongation | | Tens. str. kgs/qcm | Elongation p. c. | Loads f. elongation | |
| | | | | 300%-500% | | | | 300%-500% | |
| 3 | 30 | 117 | 817 | 29 | 48 | 47 | 631 | 13 | 23 |
|  | 40 | 117 | 780 | 30 | 51 | 42 | 591 | 13 | 24 |

Table 10.—Same aged: 12 hours at 100° C.

| 3 | 30 | 117 | | | | 36 | | | |
|---|---|---|---|---|---|---|---|---|---|
|  | 40 | 111 | | | | 33 | | | |

Table 11.—Elasticity %—Hardness in Shore's durometer degrees

| 3 | 30 | 44 | | | | 60 | 42 | | 49 |
|---|---|---|---|---|---|---|---|---|---|
|  | 40 | 44 | | | | 62 | 42 | | 50 |

The foregoing tables are to be considered merely illustrative; it is plain that compositions having any other proportions of ingredients will be within the scope of this invention. It exclusively depends on the properties desired from the cured composition whether the quantities of zinc oxide incorporated will be more or less than specified; in particular a transparent composition will contain no more than about 10 percent of zinc oxide and yet exhibit remarkably improved properties.

Compound

| | Parts |
|---|---|
| Smoked sheets | 100.0 |
| Caolin | 66.0 |
| Mineral rubber | 10.0 |
| Sulfur | 3.0 |
| Diphenylguanidine | 1.6 |
| Zinc oxide new or zinc oxide Red Seal | 16.0 or 12.5 |

Table 12

| | | 16.0 parts zinc | | 16.0 parts zinc | | 12.5 parts zinc | |
|---|---|---|---|---|---|---|---|
| Curing | | Oxide Red Seal | | Oxide new | | Oxide new | |
| Press. | Time | Tensile strength | Elongation | Tensile strength | Elongation | Tensile strength | Elongation |
| 1 atm. | 60 min. | 71 | 542 | 93 | 542 | 87 | 563 |
| 3,5 atm. | 20 min. | 129 | 538 | 155 | 552 | 144 | 554 |
|  | 30 min. | 146 | 550 | 158 | 550 | 151 | 554 |
|  | 40 min. | 143 | 548 | 155 | 565 | 145 | 543 |
|  | 60 min. | 140 | 548 | 133 | 538 | 140 | 555 |

Table 13.—Loads kgs/qcm for elongation of 300%

| 3,5 atm. | 20 min. | 51.5 | 58.5 | 54.5 |
|---|---|---|---|---|
|  | 30 min. | 56 | 61 | 58 |
|  | 40 min. | 58 | 61 | 59 |
|  | 60 min. | 58 | 59 | 58.5 |

Table 14.—Elasticity %—Hardness in Shore's durometer degrees

| 3.5 atm. | 20 min. | 66% | 50° | 67% | 52° | 67% | 52° |
|---|---|---|---|---|---|---|---|
|  | 30 min. | 68% | 52° | 70% | 55° | 69% | 53° |
|  | 40 min. | 68% | 54° | 70% | 55° | 70% | 55° |

Table 15.—Aged 12 hours at 100° C. tensile strength kgs/qcm

| 3.5 atm. | 20 min. | 114 | 126 | 118 |
|---|---|---|---|---|
|  | 30 min. | 111 | 125 | 111 |
|  | 40 min. | 108 | 114 | 105 |
|  | 60 min. | 102 | 96 | 102 |

The characteristics of this invention may be briefly summarized as follows:

A new non-pigmentous vulcanized rubber composition is obtained by using in conjunction with rubber and sulfur a new zinc oxide of a definite structure, which is characterized by a loose and large surface area, very small particle size, non-pigmenting properties, violet brown to sepia brown fluorescence when exposed to ultra-violet rays and non-reactivity with aqueous sodium thiosulfate solution. The structure involving these characteristics is exclusively due to the special method of preparing the zinc oxide which avoids any pyrogenetic operation leading to a pigmentous zinc oxide in the final step of producing the zinc oxide from another zinc compound. With respect to its action in rubber compositions the figures of the foregoing tables show that in every respect it imparts to the composition properties superior to any vulcanized rubber composition containing zinc acid.

I claim:

1. An improved vulcanized rubber composition containing a zinc oxide of non-pigmenting properties said zinc oxide being prepared by heating a zinc compound containing volatile residues under such conditions as to exclude the formation of a color pigment.

2. An improved vulcanized rubber composition containing a non-pigmenting zinc oxide obtained by converting a zinc salt into a zinc compound containing volatile residues and heating said zinc compound under such conditions as to exclude the formation of a color pigment.

3. An improved vulcanized rubber composition containing a non-pigmenting zinc oxide obtained by precipitating a zinc compound containing volatile residues from a zinc salt solution and heating the aforesaid zinc compound under such conditions as to exclude the formation of a color pigment.

4. An improved vulcanized rubber composition containing a non-pigmenting zinc oxide obtained by precipitating a zinc carbonate from a zinc salt solution and heating said zinc carbonate under such conditions as to exclude the formation of a color pigment.

5. An improved vulcanized rubber composition containing a non-pigmenting zinc oxide obtained by precipitating a zinc oxychloride from a zinc chloride solution, converting said zinc oxychloride into zinc hydrocarbonate and heating said zinc hydrocarbonate under such conditions as to exclude the formation of a color pigment.

6. An improved vulcanized rubber composition containing a non-pigmenting zinc oxide obtained by precipitating a zinc carbonate from a zinc salt solution and heating said zinc carbonate at a temperature not exceeding 600° C.

7. An improved vulcanized rubber composition containing a non-pigmenting zinc oxide obtained by precipitating zinc oxychloride from a zinc chloride solution, converting said zinc oxychloride into zinc hydrocarbonate and heating said zinc hydrocarbonate at a temperature not exceeding 600° C. until practically all the carbon dioxide has been split off.

8. An improved vulcanized rubber composition containing a non-pigmenting zinc oxide obtained by precipitating zinc oxychloride from a zinc chloride solution, reacting said zinc oxychloride with an aqueous solution of sodium bicarbonate to form zinc hydrocarbonate and heating said zinc hydrocarbonate at a temperature not exceeding 600° C.

9. An improved vulcanized rubber composition containing a non-pigmenting zinc oxide obtained by precipitating zinc carbonate from a solution of zinc sulfate and heating said zinc carbonate at a temperature of 350 to 400° C. until practically all the carbon dioxide has been split off.

10. An improved vulcanized rubber composition containing a non-pigmenting zinc oxide obtained by precipitating zinc oxychloride from a zinc chloride solution, reacting said zinc oxychloride with an aqueous solution of sodium bicarbonate to form zinc hydrocarbonate and heating said zinc hydrocarbonate at a temperature of 450 to 500° C. until practically all the carbon dioxide has been split off.

11. An improved vulcanized rubber composition containing a non-pigmenting zinc oxide obtained by converting a pigmentous zinc oxide of coarse particle size into a zinc carbonate by reacting said zinc oxide with a sodium carbonate and heating the resulting zinc carbonate at a temperature not exceeding 600° C. until practically all the carbon dioxide has been split off.

12. An improved vulcanized rubber composition containing a non-pigmenting zinc oxide obtained by converting a pigmentous zinc oxide of coarse particle size into a zinc carbonate by reacting said zinc oxide with sodium bicarbonate to form zinc hydrocarbonate and heating the resulting zinc hydrocarbonate at a temperature of about 450° C. until practically all the carbon dioxide has been split off.

13. A process of vulcanizing rubber which comprises admixing with the rubber and sulfur a non-pigmenting zinc oxide prepared by heating a zinc compound containing volatile residues under such conditions as to exclude the formation of a color pigment, and heating the mixture until the cure is finished.

14. A process of vulcanizing rubber which comprises admixing with the rubber and sulfur a non-pigmenting zinc oxide prepared by converting a zinc salt into a zinc compound containing volatile residues and heating said zinc compounds under such conditions as to exclude the formation of a color pigment and heating the mixture until the cure is finished.

15. A process of vulcanizing rubber which comprises admixing with the rubber and sulfur a non-pigmenting zinc oxide prepared by precipitating a zinc compound containing volatile residues from a zinc salt solution and heating said zinc compound under such conditions as to exclude the formation of a color pigment and heating the mixture until the cure is finished.

16. A process of vulcanizing rubber which comprises admixing with the rubber and sulfur a non-pigmenting zinc oxide prepared by precipitating a zinc carbonate from a zinc salt solution and heating said zinc carbonate under such conditions as to exclude the formation of a color pigment, and heating the mixture until the cure is finished.

17. A process of vulcanizing rubber which comprises admixing with the rubber and sulfur a non-pigmenting zinc oxide prepared by precipitating a zinc oxychloride from a zinc chloride solution reacting said zinc oxychloride with sodium bicarbonate to form zinc hydrocarbonate, and heating said zinc hydrocarbonate under such conditions as to exclude the formation of a color pigment, and heating the mixture until the cure is finished.

18. A process of vulcanizing rubber which comprises admixing with the rubber and sulfur a non-pigmenting zinc oxide prepared by precipitating a zinc carbonate from a zinc salt solution, converting said zinc oxychloride into zinc hydrocarbonate and heating said zinc carbonate at a temperature not exceeding 600° C., and heating the mixture under such conditions as to exclude the formation of a color pigment and heating the mixture until the cure is finished.

19. A process of vulcanizing rubber which comprises admixing with the rubber and sulfur a non-pigmenting zinc oxide prepared by precipitating a zinc oxychloride from a zinc chloride solution, converting said zinc oxychloride into a zinc hydrocarbonate and heating said zinc hydrocarbonate at a temperature not exceeding 600° C. until practically all the carbon dioxide has been split off, and heating the mixture until the cure is finished.

20. A process of vulcanizing rubber which comprises admixing with the rubber and sulfur a non-pigmenting zinc oxide prepared by precipitating a zinc oxychloride from a zinc chloride solution reacting said zinc oxychloride with sodium bicarbonate to form zinc hydrocarbonate and heating said zinc hydrocarbonate at a temperature not exceeding 600° C., until practically all the carbon dioxide has been split off, and heating the mixture until the cure is finished.

21. A process of vulcanizing rubber which comprises admixing with the rubber and sulfur a non-pigmenting zinc oxide prepared by precipitating zinc carbonate from a zinc sulfate solution and heating said zinc carbonate at a temperature of 350 to 400° C. until practically all the carbon dioxide has been split off, and heating the mixture until the cure is finished.

22. A process of vulcanizing rubber which comprises admixing with the rubber and sulfur a non-pigmenting zinc oxide obtained by precipitating zinc oxychloride from a zinc chloride solution, reacting said zinc oxychloride with an aqueous solution of sodium bicarbonate to form zinc hydrocarbonate and heating said zinc hydrocarbonate at a temperature of 450 to 500° C. until practically all the carbon dioxide has been split off, and heating the mixture until the cure is finished.

23. A process of vulcanizing rubber which comprises admixing with the rubber and sulfur a non-pigmenting zinc oxide obtained by converting a pigmentous zinc oxide of coarse particle size into a zinc carbonate by reacting said zinc oxide with a sodium carbonate to form a zinc carbonate and heating the resulting zinc carbonate at a temperature not exceeding 600° C. until practically all the carbon dioxide has been split off, and heating the mixture until the cure is finished.

24. A process of vulcanizing rubber which comprises admixing with the rubber and sulfur a non-pigmenting zinc oxide obtained by converting a pigmentous zinc oxide of coarse particle size into a zinc carbonate by reacting said zinc oxide with sodium bicarbonate to form zinc hydrocarbonate and heating the resulting zinc hydrocarbonate at a temperature of about 450° C. until practically all the carbon dioxide has been split off, and heating the mixture until the cure is finished.

25. An improved vulcanized rubber composition containing a zinc oxide of non-pigmenting properties, said zinc oxide being prepared by heating a zinc compound containing volatile residues at a temperature below 600° C. until said volatile residues have been substantially expelled.

26. A process of vulcanizing rubber which comprises admixing with the rubber and sulphur a non-pigmenting zinc oxide prepared by heating a zinc compound containing volatile residues at a temperature below 600° C. until said volatile residues have been substantially expelled and then heating the mixture until the cure is finished.

27. An improved vulcanized rubber composition containing a zinc oxide of non-pigmenting properties, said zinc oxide having a roentgenophicly mensurated particle size of about $0.013 \pm 0.005$ microns, an oil absorption of at least 75 grams of linseed oil calculated on 100 grams of the zinc oxide and having a violet brown to sepia brown fluorescence when exposed to ultraviolet light of less than 4000 Angstroem units wave length, said zinc oxide being prepared by heating a zinc compound having volatile residues at a temperature below 600° C. until the volatile residues are substantially expelled.

In testimony whereof, I affix my signature.

HERMANN OEHME.